United States Patent
Chen

(10) Patent No.: US 10,268,017 B2
(45) Date of Patent: Apr. 23, 2019

(54) LENS HOLDER, MANUFACTURING MEHTOD THEREOF AND PORTABLE ELECTRONIC DEVICE

(71) Applicant: Genius Electronic Optical Co., Ltd., Taichung (TW)

(72) Inventor: Ching-Hung Chen, Taichung (TW)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 72 days.

(21) Appl. No.: 15/152,566

(22) Filed: May 12, 2016

(65) Prior Publication Data
US 2017/0285292 A1 Oct. 5, 2017

(30) Foreign Application Priority Data
Apr. 1, 2016 (CN) .......................... 2016 1 0201848

(51) Int. Cl.
*G02B 7/02* (2006.01)
*B29C 45/00* (2006.01)
*H04N 5/225* (2006.01)
*G03B 17/12* (2006.01)

(52) U.S. Cl.
CPC ............ *G02B 7/02* (2013.01); *B29C 45/0025* (2013.01); *B29C 45/0046* (2013.01); *G03B 17/12* (2013.01); *H04N 5/2254* (2013.01); *B29C 2045/0027* (2013.01)

(58) Field of Classification Search
CPC . G02B 7/02; G02B 7/00; G02B 7/021; G02B 7/022; B29C 45/0025; B29C 2045/0027; H04N 5/2254
USPC ................................ 359/819; 264/299, 328.1
See application file for complete search history.

(56) References Cited

U.S. PATENT DOCUMENTS

| | | | |
|---|---|---|---|
| 9,019,378 B2 * | 4/2015 | Nakajima | G02B 7/021 348/148 |
| 2006/0138179 A1 * | 6/2006 | Suffa | B65D 47/0804 222/490 |
| 2011/0063739 A1 * | 3/2011 | Hirata | G02B 7/021 359/819 |
| 2015/0244904 A1 | 8/2015 | Bone et al. | |

* cited by examiner

Primary Examiner — Wen Huang
(74) Attorney, Agent, or Firm — JCIPRNET

(57) ABSTRACT

A lens holder including a base, a gate mark and a tubular portion is provided. The base includes a plurality of sidewalls, and any two adjacent sidewalls are connected to each other to form an outer edge. A turning corner is formed between every two adjacent sidewalls, and the base includes a chamfer located at a turning corner. The gate mark is disposed at the chamfer. The tubular portion is connected to the base, and the tubular portion extends along the direction away from the base. Besides, a portable electronic device and a manufacturing method of the lens holder are also provided.

18 Claims, 6 Drawing Sheets

LENS HOLDER, MANUFACTURING MEHTOD THEREOF AND PORTABLE ELECTRONIC DEVICE

CROSS-REFERENCE TO RELATED APPLICATION

This application claims the priority benefit of China application serial no. 201610201848.X, filed on Apr. 1, 2016. The entirety of the above-mentioned patent application is hereby incorporated by reference herein and made a part of this specification.

BACKGROUND OF THE INVENTION

1. Field of the Invention

The invention relates to a lens holder, a portable electronic device, and a manufacturing method of a lens holder.

2. Description of Related Art

Recently, portable electronic devices such as mobile phones, tablet computers, and notebook computers have become indispensable in the life of modern people. In general, most of the portable electronic devices include a camera to cope with the user's needs in their daily life. However, in the trend of pursuing lightness and slimness of the portable electronic devices, the camera lens of the portable electronic devices must be designed to be smaller and thinner, and the lens holder that accommodates the optical element of the camera must as well be designed to become even smaller. To design a smaller lens holder, the wall thickness of the sidewall in the lens holder must be thinner.

In general, the lens holder of a camera is manufactured by performing an injection molding process, for example. To make the wall thickness of the lens holder thinner, the flow channel of the mold must also be narrower. When the molding material flows through the narrow flow channel in the mold, the liquidity of the molding material is lower, making molding more difficult. Besides, in products manufactured by injection molding, some molding materials of the gate may remain and protrude from the surface in the product originally designed. Thus, the surface of the product must be designed to slightly retract. Currently, the lens holder is manufactured by disposing the gate on the sidewall of the lens holder. Thus, the product surface at the position of the gate must be designed to retract inwardly. Therefore, the flow channel corresponding to the gate point becomes even narrower than the flow channel elsewhere. Consequently, the liquidity of the molding material becomes lower, making it difficult to manufacture the lens holder and increase the yield rate. Besides, since the channel width corresponding to the gate point is different from the channel width elsewhere, the wall thickness is not consistent throughout the lens holder, and the overall structural strength is not preferable. In addition, the lens holder may easily have cracks on the sidewall corresponding to the gate. Moreover, since the gate is disposed on the sidewall of the lens holder, the molding material needs to turn 90 degrees soon after flowing into the flow channel, the liquidity of the molding material significantly decreases after entering the flow channel, which also makes the manufacturing process more difficult. Even though the liquidity of the molding material may be increased by heating or pressing, the product may turn gray and become more fragile easily when heated, and may show defects such as burrs when pressed. Thus, how to increase the liquidity of the molding material after the molding material enters the flow channel and maintain a desirable molding quality while keep the wall thickness of the lens holder thin is an issue that people having ordinary skills in the art should work on.

SUMMARY OF THE INVENTION

The invention provides a lens holder having a thinner wall thickness and a smaller size. In addition, the lens holder has a higher yield rate and a lower manufacturing cost.

The invention provides a portable electronic device that is lighter and thinner. In addition, the portable electronic device has a lower manufacturing cost.

The invention provides a manufacturing method of a lens holder. A lens holder manufactured by using the manufacturing method has a thinner wall thickness and a smaller size. In addition, the lens holder has a higher yield rate and a lower manufacturing cost.

A lens holder according to an embodiment of the invention includes a base, a gate mark, and a tubular portion. The base includes a plurality of sidewalls, and any two adjacent sidewalls are connected to each other to form an outer edge. A turning corner is formed between every two adjacent sidewalls of the sidewalls, and the base includes a chamfer located at a turning corner. The gate mark is disposed at the chamfer. The tubular portion is connected to the base and extends in a direction away from the base.

A portable electronic device according to an embodiment of the invention includes a mobile phone, a tablet computer, or a notebook computer. The portable electronic device includes the lens holder, a lens barrel, and at least one lens. The lens barrel is disposed on the lens holder, and the at least one lens is disposed in the lens barrel.

A manufacturing method of a lens holder according to an embodiment includes injecting a molding material into an injection molding mold. The injection molding mold includes an injection flow channel. The molding material flows through the injection flow channel and enters a molding cavity of the injection molding mold. The manufacturing method of the lens holder also includes curing the molding material to form a lens holder in the molding cavity. The lens holder includes a base and a tubular portion. The base includes a plurality of sidewalls, and any two adjacent sidewalls are connected to each other to form an outer edge. A turning corner is formed between every two adjacent sidewalls of the sidewalls, and the base includes a chamfer located at a turning corner. The injection flow channel is disposed in correspondence with the chamfer.

Based on above, in the manufacturing method of the lens holder according to the embodiments of the invention, the base of the lens holder formed in the molding cavity of the injection molding mold includes a plurality of sidewalls. Any two adjacent sidewalls are connected to each other to form the outer edge. A turning corner is formed between every two adjacent sidewalls of the sidewalls, and the base includes a chamfer located at a turning corner. The injection flow channel of the injection molding mold is disposed in correspondence with the chamfer. Thus, the lens holder manufactured by using the manufacturing method of the lens holder of according to the embodiments of the invention includes the gate mark disposed at the chamfer. Thus, after the molding material enters the molding cavity from the gate point, the molding material does not need to make a significant turn, and the molding material may be maintained at a higher flow rate after entering the molding cavity. Thus, the lens holder manufactured by using the manufacturing method of the lens holder according to the embodiments of the invention has a uniform wall thickness throughout the lens holder and a preferable overall structural strength. In addition, the lens holder has a higher yield rate and a lower manufacturing cost. In addition, according to the manufacturing method of the lens holder, the gate is disposed at the turning corner between two adjacent sidewalls, so the wall thickness of the sidewalls does not need to be reduced due to the gate. In other words, the thinner sidewalls may be manufactured, so as to make the size of the lens holder smaller. In addition, the manufacturing method of the lens holder is able to increase the liquidity of the molding material without heating or pressing, so the lens holder may have a preferable molding quality. Furthermore, the portable electronic device with the small-sized lens holder may be thinner and lighter, and the manufacturing cost of the portable electronic device may be lower.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
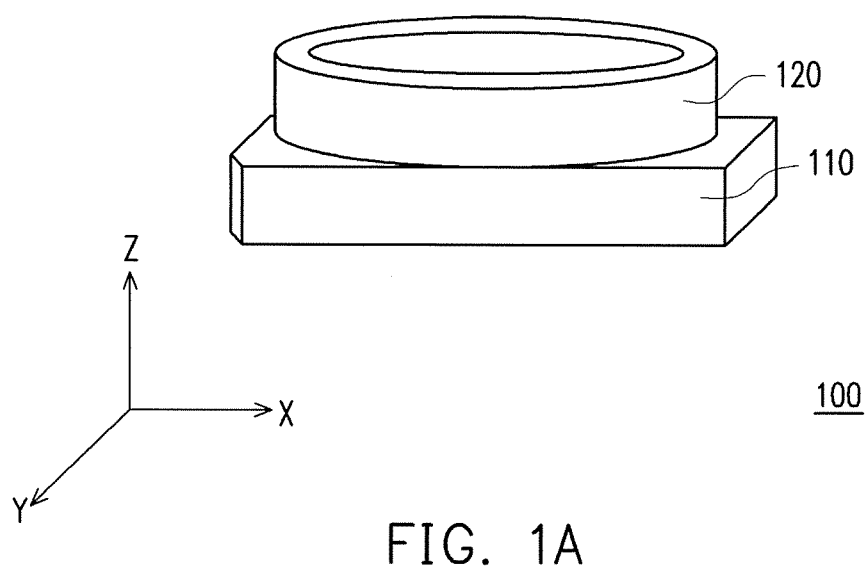
FIG. 1A is a schematic three-dimensional view illustrating a lens holder according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
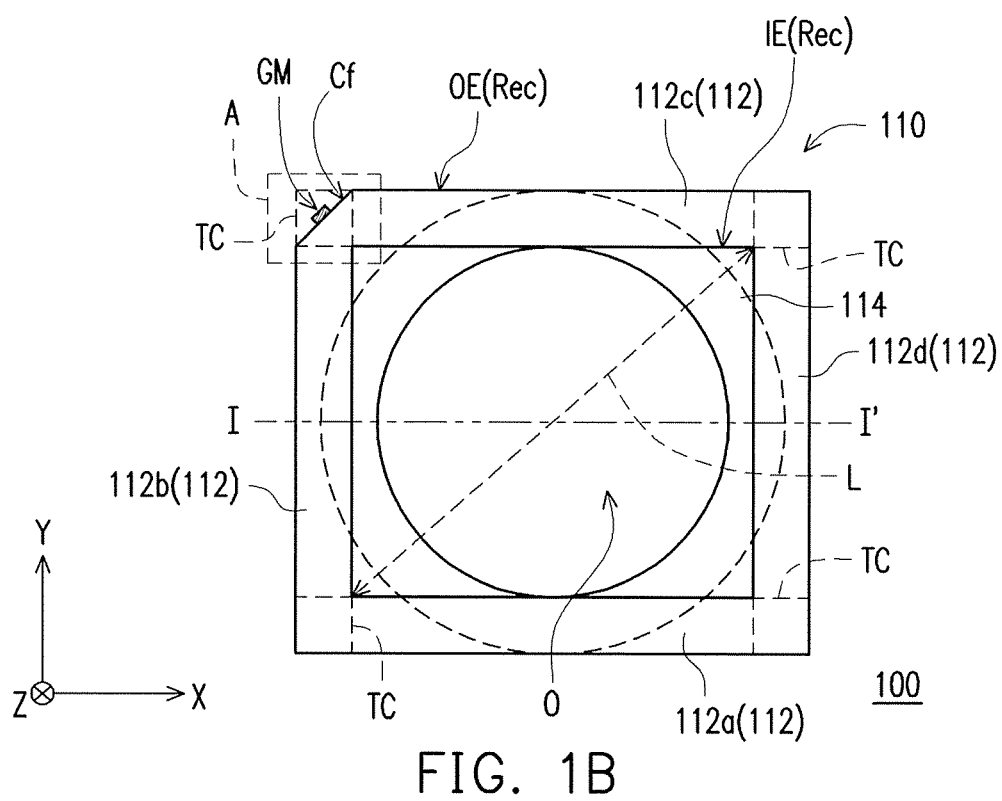
FIG. 1B is a schematic bottom view illustrating the lens holder in the embodiment of FIG. 1A.
Figure 1C:
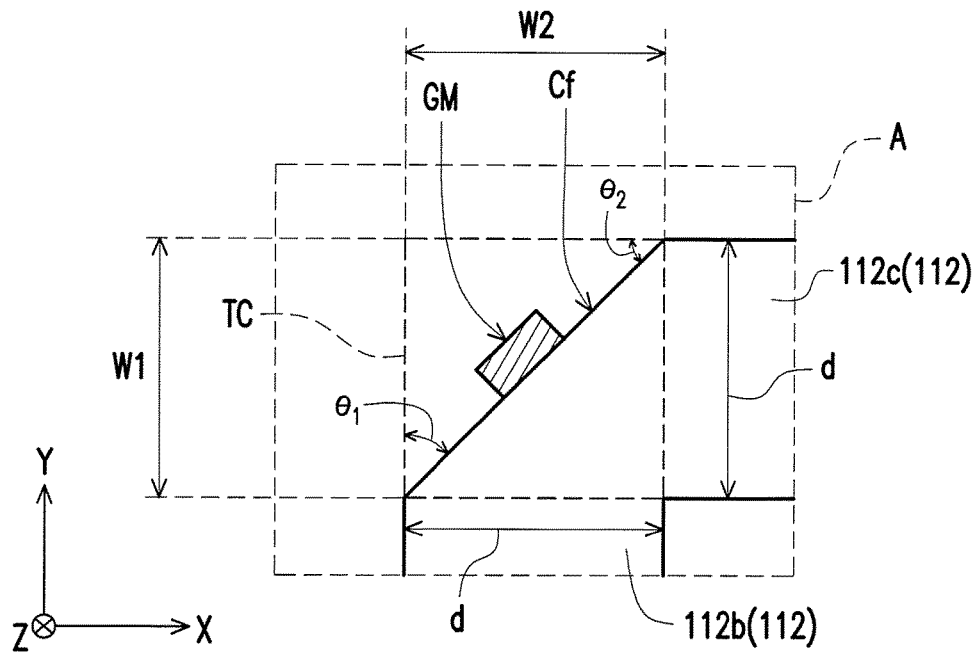
FIG. 1C is a schematic enlarged view illustrating an area A in the embodiment of FIG. 1B.
Figure 1D:
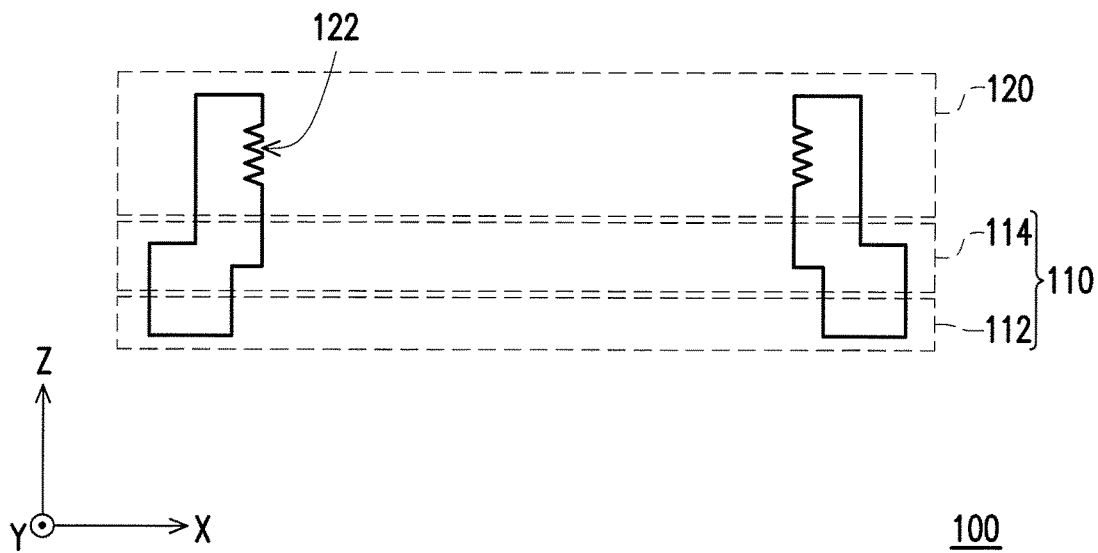
FIG. 1D is a schematic cross-sectional view illustrating the lens holder in the embodiment of FIG. 1B along a broken line I-I'.

FIG. 1A is a schematic three-dimensional view illustrating a lens holder according to an embodiment of the invention, FIG. 1B is a schematic bottom view illustrating the lens holder in the embodiment of FIG. 1A, FIG. 1C is a schematic enlarged view illustrating an area A in the embodiment of FIG. 1B, and FIG. 1D is a schematic cross-sectional view illustrating the lens holder in the embodiment of FIG. 1B along a broken line I-I'. In this embodiment, the broken line I-I' is a cutting line used to illustrate the internal components in the cross-section of the lens holder 100. It should be understood that the broken line I-I' of this embodiment shall not be construed as a limitation on the invention. Referring to FIG. 1A, in this embodiment, a lens holder 100 includes a base 110 and a tubular portion 120. The tubular portion 120 is connected to the base 110, and the tubular portion 120 extends in a direction away from the base 110. In addition, referring to FIGS. 1A and 1B, the base 110 includes a plurality of sidewalls 112. Any two sidewalls 112 are connected to each other to form an outer edge OE. Specifically, the sidewalls 112 include four sidewalls 112, and the outer edge OE of this embodiment is a rectangle Rec with a chamfer of substantially 45 degrees at a corner. Moreover, the sidewalls 112 forming the outer edge OE include a sidewall 112a, a sidewall 112b, a sidewall 112c, and a sidewall 112d. However, in some embodiments, the outer edge may also be in other shapes, such as a square, a parallelogram, a trapezoid, or other polygons. Correspondingly, the base in these embodiments may include a suitable number of sidewalls to form the shapes of the outer edge. Namely, the invention does not intend to impose a limitation on the number of the sidewalls, the arrangement of the sidewalls, and the shape of the outer edge.

Referring to FIGS. 1B and 1D, in this embodiment, the lens holder 100 further includes a top wall 114, and the sidewalls 112 are connected to the top wall 114. The top wall 114 includes an opening O, and the tubular portion 120 is connected to the opening O. Specifically, the tubular portion 120 may extend along a direction substantially perpendicular to the top wall 114. The lens holder 100 is a lens holder accommodating a camera lens, for example. In addition, the camera lens may be a camera lens of a mobile phone, a table computer, a notebook computer, or other portable electronic devices, for example. A screw 122 or other types of locking members may be disposed at an inner side of the tubular portion 120, such that a lens barrel of the camera lens may be locked to the lens holder 100. In some embodiments, the lens holder 100 may also be used with other types of camera lenses, and the invention is not limited thereto.

Referring to FIGS. 1B and 1D again, in this embodiment, the lens holder 100 is located in a space constructed by a first axis X, a second axis Y, and a third axis Z, for example. In addition, the first axis X is perpendicular to the second axis Y, and the first axis X and the second axis Y are respectively parallel to two of the sides of the outer edge QE perpendicular to each other. In addition, extending directions of the third axis Z and the tubular portion 120 are parallel to each other, and the third axis Z is perpendicular to the first axis X and the second axis Y.

Referring to FIG. 1B, in this embodiment, a turning corner TC is formed between two adjacent sidewalls 112 of the sidewalls 112. In addition, the base 110 includes a chamfer Cf located at a turning corner TC. Specifically, the base 110 includes the chamfer Cf, and the chamfer Cf is located at the turning corner TC between the sidewall 112b and the sidewall 112c. However, in some embodiments, the base 110 may also include a plurality of the chamfers CF, and the chamfers Cf may be respectively located at different turning corners TC. It should be understood that the invention does not intend to impose a limitation in this regard. Moreover, in this embodiment, the lens holder 100 further includes a gate mark GM disposed at the chamfer Cf. The gate mark GM is formed from a residual molding material cured after the lens holder 100 is manufactured by performing an injection molding process, for example, and the gate mark GM protrudes from a surface of the chamfer Cf. Specifically, the space occupied by the gate mark GM is not greater than the space of the sidewalls 112 reduced by disposing the chamfer Cf. In other words, a portion of the sidewalls 112 reduced to dispose the chamfer Cf preserves the space occupied by the gate mark GM, so as to prevent the gate mark GM from affecting assembling of the lens holder 100 in relevant uses. However, in some embodiments, the space of the sidewalls 112 reduced to disposed the chamfer Cf may be adjusted based on the manufacturing requirements. Besides, in other embodiments, the lens holder 100 may also include a plurality of the chamfers Cf and a plurality of the gate marks GM. The gate marks GM are respectively disposed at the different chamfers Cf. In addition, corresponding relations between the gate marks GM and the chamfers Cf may be set based on the manufacturing requirements without a specific limitation. For example, the gate marks GM may be provided on some of the chamfers Cf but not some other chamfers Cf. Alternatively, a plurality of the gate marks GM may be disposed on one chamfer Cf. The invention does not intend to impose a limitation on the number of the chamfers Cf, the number of the gate marks GM, and the corresponding relations between the gate marks GM and the chamfers Cf.

Referring to FIGS. 1B and 1C, in this embodiment, the sidewalls 112 of the lens holder 100 further form an inner edge IE, and the inner edge IE is the rectangle Rec. Specifically, when the lens holder 100 is used with a camera lens, such as a camera lens of a mobile phone, an optical sensing element, such as a charge-coupled device (CCD), a complementary metal-oxide-semiconductor (CMOS) image sensor, or other types of optical sensing elements, of a camera module of the mobile phone is disposed in an area surrounded by the inner edge IE. In this embodiment, the sidewalls 112 of the lens holder 100 have a wall thickness d, and an angle of the chamfer Cf is substantially 45 degrees. Specifically, an included angle $\theta_1$ is provided between a surface where the chamfer Cf is located and the sidewall 112b, and an included angle $\theta_2$ is provided between the surface where the chamfer Cf is located and the sidewall 112c. In addition, the included angle $\theta_1$ and the included angle $\theta_2$ are 45 degrees. In addition, the chamfer Cf has a width W1 in a direction parallel to the first axis X, and the chamfer Cf has a width W2 in a direction parallel to the second axis Y. Moreover, the width W1 and the width W2 are equal. Specifically, the width W1 (or the width W2) of the chamfer Cf is substantially $(2-\sqrt{2})d$, and a tolerance of the width W1 (or the width W2) of the chamfer Cf is smaller than or equal to 10% of $(2-\sqrt{2})d$. Namely, the width W1 (or the width W2) of the chamfer Cf is $(2-\sqrt{2})d\pm10\%$, for example. However, in some embodiments, the widths W1 and W2 may be properly designed based on the requirements, and the invention is not limited thereto. Furthermore, in this embodiment, the size of the inner edge IE of the rectangle REC is suitable for a light sensing element smaller than or equal to one inch. Namely, the inner edge IE may surround and contact the light sensing element whose size is smaller than or equal to one inch. In addition, the size of the light sensing element here refers to the size of a diagonal of a light sensing area of the light sensing element defined in this field. Specifically, the size of the rectangle Rec matches the size of the optical sensing element (e.g., the size of the CCD or CMOS image sensor) of the camera of the mobile phone, for example. For example, a length of a diagonal L of the inner edge IE of the rectangle Rec is suitable for a light sensing element whose size is ⅓ inches to 1 inch. Alternatively, the length of the diagonal L may be other diagonal length values. It should be noted that the invention does not intend to impose a limitation in this regard.

Figure 2:
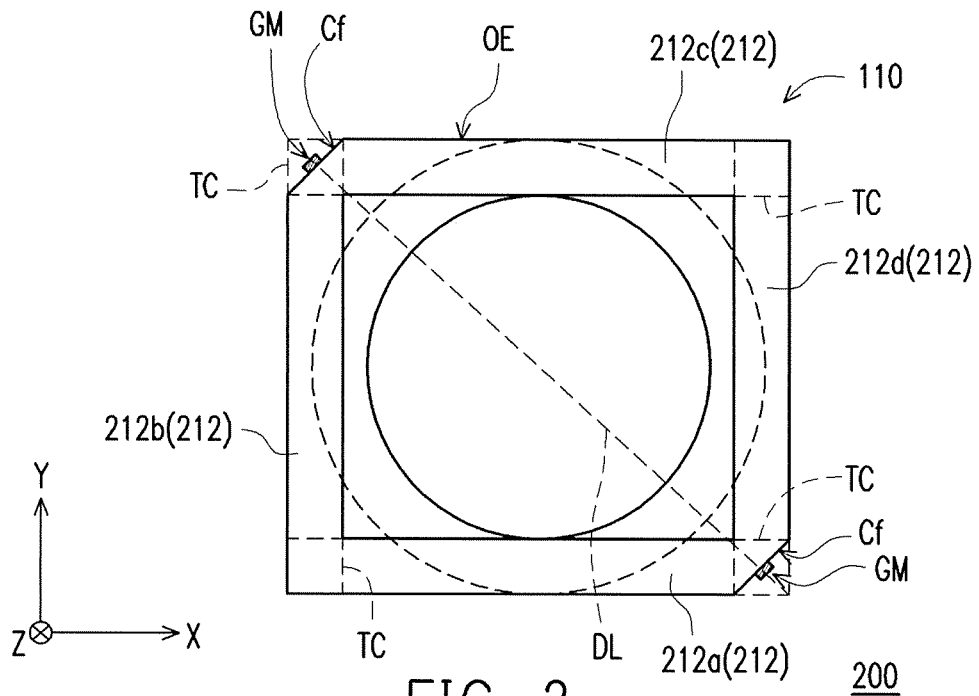
FIG. 2 is a schematic bottom view illustrating a lens holder according to another embodiment of the invention.

FIG. 2 is a schematic bottom view illustrating a lens holder according to another embodiment of the invention. Referring to FIG. 2, in this embodiment, a lens holder 200 is similar to the lens holder 100 shown in FIGS. 1A to 1D. Relevant descriptions concerning the components of the lens holder 200 may be referred to the descriptions about the lens holder 100 shown in FIGS. 1A to 1D. Thus, details in this regard will not be repeated in the following. The differences between the lens holder 200 and the lens holder 100 may be referred to the following. The lens holder 200 includes a plurality of sidewalls 212. Any two sidewalls 212 are connected to each other to form the outer edge OE. The turning corner TC is formed between two adjacent sidewalls 212. In addition, a base 210 of the lens holder 200 includes two chamfers Cf located at two turning corners TC. In addition, the chamfers Cf are located on a diagonal DL of the outer edge OE. In addition, the lens holder 200 includes two gate marks GM. In addition, the gate marks GM are respectively disposed at different chamfers Cf. Specifically, the sidewalls 212 include a sidewall 212a, a sidewall 212b, a sidewall 212c, and a sidewall 212d, and the base 210 includes two chamfers Cf. One of the chamfers Cf is located at the turning corner TC between the sidewall 212b and sidewall 212c, and one of the gate marks GM of the lens holder 200 is disposed at the chamfer Cf. The other of the chamfers Cf is located at the turning corner TC between the sidewall 212a and the sidewall 212d, and the other of the gate marks GM is disposed at the chamfer Cf. Furthermore, in some embodiments, the invention does not intend to impose a limitation on the number of the chamfers Cf, the number of the gate marks GM, and the corresponding relations between the gate marks GM and the chamfers Cf, as also set forth in the descriptions about the embodiment shown in FIGS. 1A to 1D.

Figure 3:
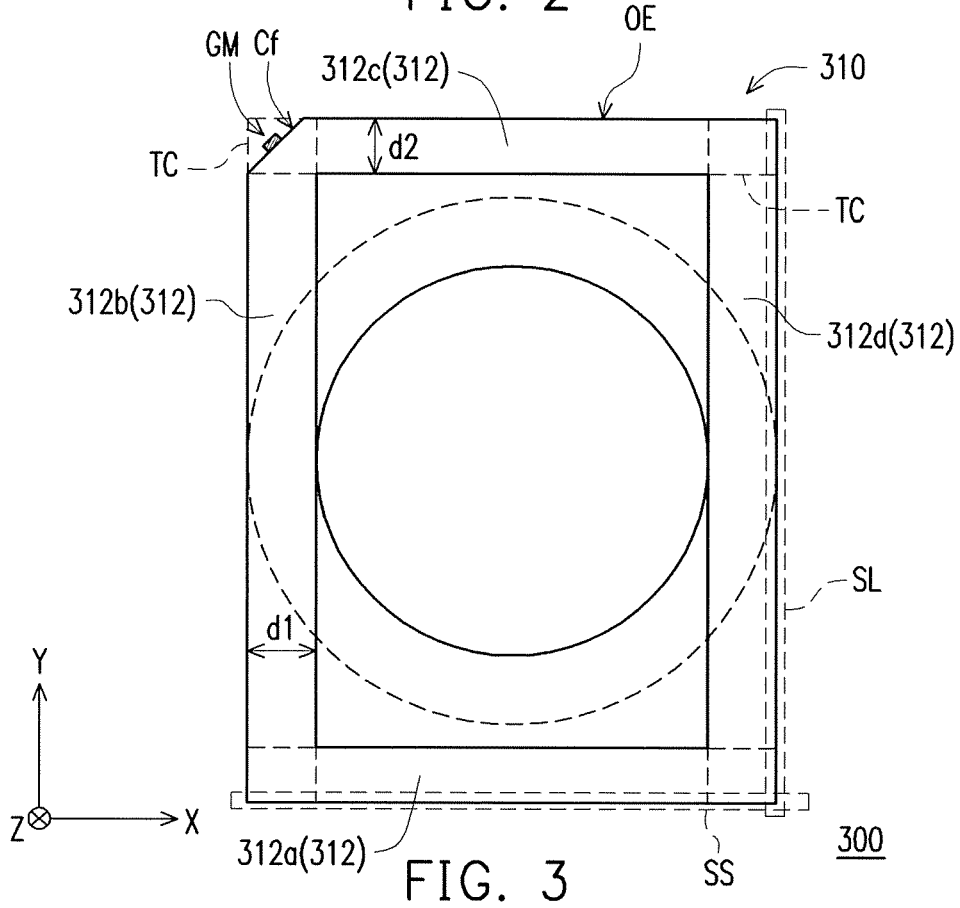
FIG. 3 is a schematic bottom view illustrating a lens holder according to yet another embodiment of the invention.

FIG. 3 is a schematic bottom view illustrating a lens holder according to yet another embodiment of the invention. Referring to FIG. 3, in this embodiment, a lens holder 300 is similar to the lens holder 100 shown in FIGS. 1A to 1D. Relevant descriptions concerning the components of the lens holder 300 may be referred to the descriptions about the lens holder 100 shown in FIGS. 1A to 1D. Thus, details in this regard will not be repeated in the following. The differences between the lens holder 300 and the lens holder 100 may be referred to the following. The lens holder 300 includes a base 310, and the base 310 includes a plurality of sidewalls 312. The sidewalls 312 are connected to each other to form the outer edge OE. The sidewalls 312 include first sidewalls 312*b* and 312*d* and second sidewalls 312*a* and 312*c*. The first sidewalls 312*b* and 312*d* and the second sidewalls 312*a* and 312*c* respectively form long sides SL and short sides SS of the outer edge QE. In addition, wall thicknesses of the first sidewalls 312*b* and 312*d* are greater than wall thicknesses of the second sidewall 312*a* and 312*c*. Specifically, the outer edge OE is a rectangle with a chamfer of substantially 45 degrees at a corner, for example, and has the long sides SL and the short sides SS. In addition, a length of the long side SL is greater than a length of the short side SS. The first sidewall 312*b* and the first sidewall 312*d* form the long sides SL of the outer edge QE, whereas the second sidewall 312*a* and the second sidewall 312*c* form the short sides SS of the outer edge QE. In this embodiment, the first sidewall 312*b* and the first sidewall 312*d* have the same wall thickness d1, and the second sidewall 312*a* and the second sidewall 312*c* have the same wall thickness d2. In addition, the wall thickness d1 is greater than the wall thickness d2. Specifically, when the lens holder 300 is manufactured by injection molding, a wider flow channel in a molding cavity of an injection molding mold permits a greater liquidity of a molding material. Thus, the shape of the material being molded is able to more closely conform to the shape in the original design, and a molding quality of the material is able to be improved. Consequently, designing a wider flow channel in the molding cavity indicates the thicker wall thickness d1. The longer sidewalls 312 are thus able to exhibit a preferable molding quality because of the wider flow channel in the molding cavity. For example, by designing the longer sidewalls 312 to have the thicker wall thickness d1, the shape of the longer sidewalls 312 is able to more closely conform to the shape of the original design, and the overall wall thickness d1 is able to be more uniform. In some embodiments, the wall thickness of the sidewalls 312 may be properly designed based on the lengths of the different sidewalls 312, so as to improve the molding quality. However, it should be understood that the invention is not limited thereto.

Figure 4A:
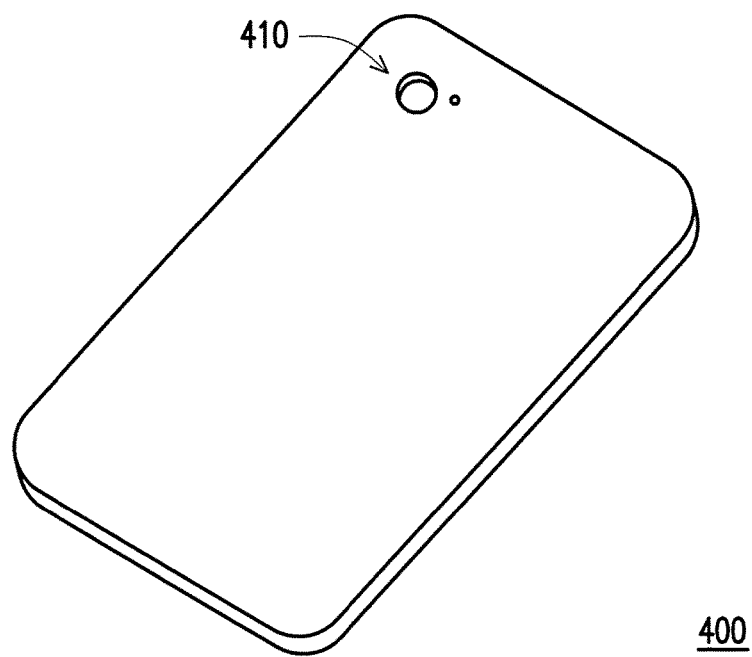
FIG. 4A is a schematic three-dimensional view illustrating a portable electronic device according to an embodiment of the invention.
Figure 4B:
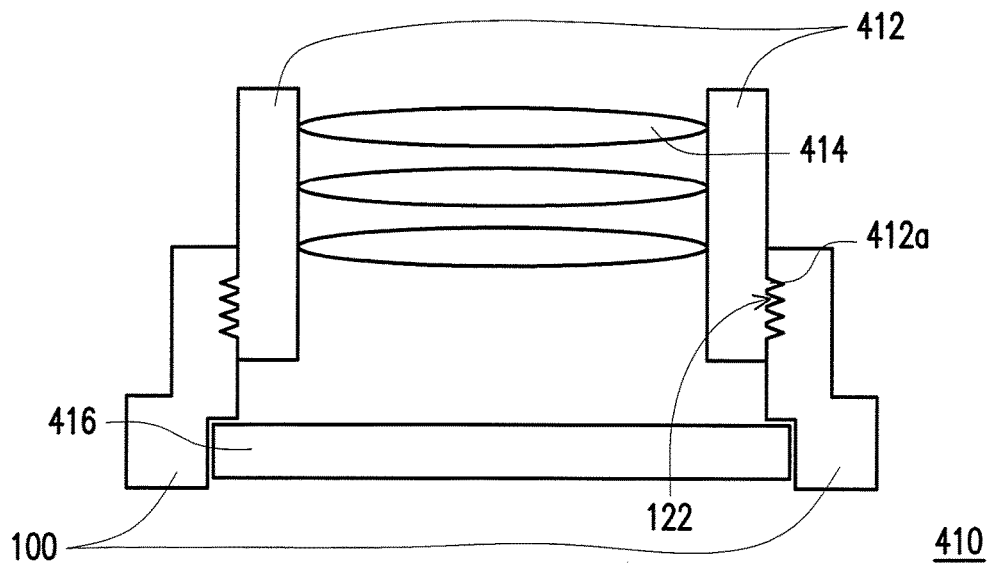
FIG. 4B is a schematic cross-sectional view illustrating a camera module of the portable electronic device in the embodiment of FIG. 4A.

FIG. 4A is a schematic three-dimensional view illustrating a portable electronic device according to an embodiment of the invention, and FIG. 4B is a schematic cross-sectional view illustrating a camera module of the portable electronic device in the embodiment of FIG. 4A. Referring to FIGS. 4A and 4B, a portable electronic device 400 in this embodiment includes a camera module 410, and the camera module 410 includes the lens holder 100, a lens barrel 412, and at least one lens 414. The lens barrel 412 is disposed on the lens holder 100, and the at least one lens 414 is disposed in the lens barrel 412. In addition, the lens barrel 412 has a thread 412*a*, and the lens barrel 412 may be locked to the lens holder 100 by means of the thread 412*a* together with the screw 122. Alternatively, the lens barrel 412 may also be locked to the lens holder 100 by means of other locking members. It should be noted that the lens 414 in FIG. 4B is only provided as an example to illustrate the number and shape of lenses. Based on the optical requirements on the lens, a suitable shape and number of the lens 414 may be used in the camera module 410, and the invention does not intend to impose a limitation in this regard. Specifically, the lens holder 100 of the portable electronic device 400 may be the lens holder 100 in the embodiment of FIGS. 1A to 1D. In addition, the lens module 410 further includes an optical sensing element 416. The optical sensing element 416 is disposed in a space formed by the sidewalls 112 of the lens holder 100. Namely, the optical sensing element 416 is located in an area surrounded by the inner edge IE. The optical sensing element 416 is a CCD, a CMOS image sensor, or other types of optical sensing elements, for example, and the invention does not intend to impose a limitation in this regard. In some embodiments, the portable electronic device 400 may also adopt the lens holder 200 in the embodiment of FIG. 2, the lens holder 300 in the embodiment of FIG. 3, or other types of lens holders. It should be understood that the invention does not intend to impose a limitation in this regard. In this embodiment, the portable electronic device 400 is a mobile phone, and the camera module 410 is a rear lens module of the mobile phone. However, in other embodiments, the portable electronic device 400 may include a mobile phone, a tablet computer, or a notebook computer, etc. Alternatively, the portable electronic device 400 may be other types of portable electronic devices. The invention does not intend to limit the type of the portable electronic device 400, and the invention does not intend to limit the position of the camera module 410 in the portable electronic device 400. For example, the portable electronic device 400 may be a mobile phone, and the camera module 410 may be a front lens module of the mobile phone.

Figure 5A:
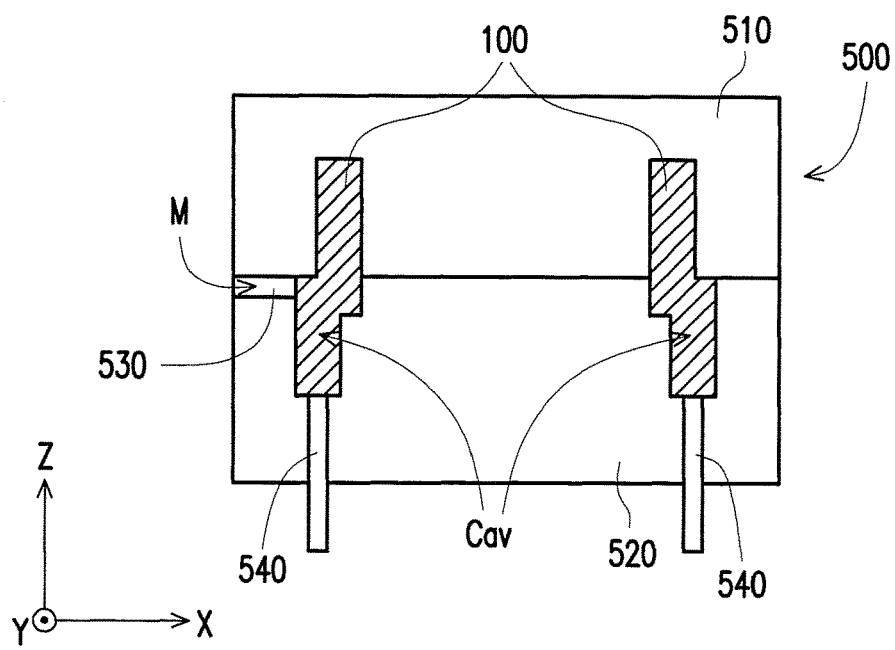
FIG. 5A is a schematic view illustrating formation of a lens holder in a injection molding mold in a manufacturing method of a lens holder according to an embodiment of the invention.
Figure 5B:
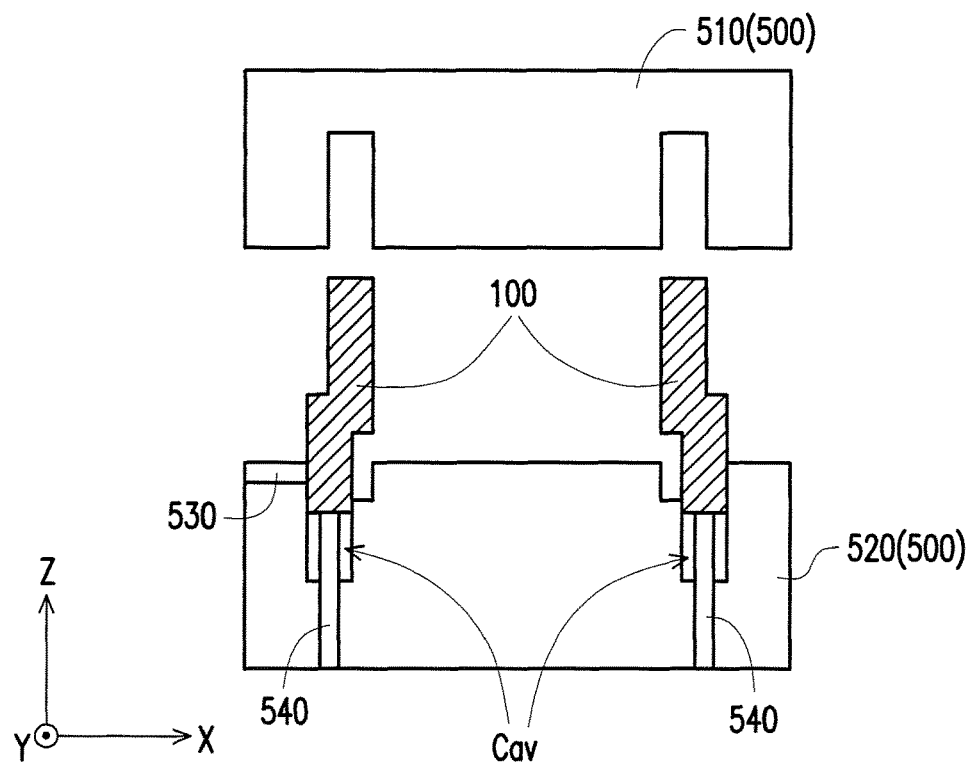
FIG. 5B is a schematic view illustrating obtaining the lens holder from the injection molding mold in the manufacturing method of the lens holder in the embodiment of FIG. 5A.
Figure 5C:
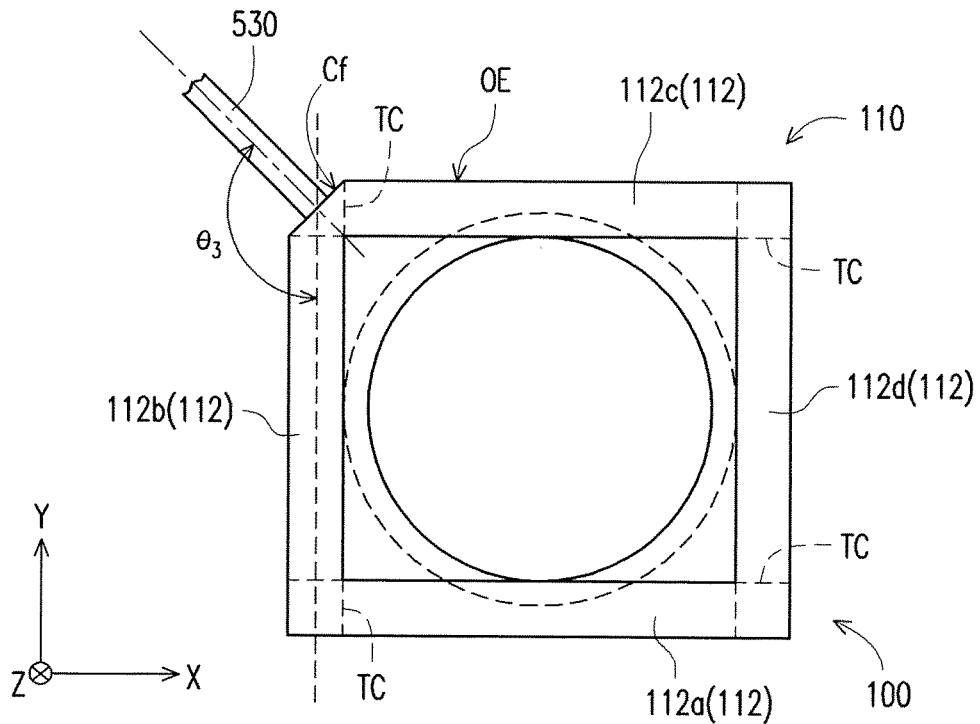
FIG. 5C is a schematic view illustrating that an injection flow channel corresponds to a chamfer of the lens holder in the manufacturing method of the lens holder in the embodiment of FIG. 5A.

FIG. 5A is a schematic view illustrating formation of a lens holder in an injection molding mold in a manufacturing method of a lens holder according to an embodiment of the invention, FIG. 5B is a schematic view illustrating obtaining the lens holder from the injection molding mold in the manufacturing method of the lens holder in the embodiment of FIG. 5A, and FIG. 5C is a schematic view illustrating that an injection flow channel corresponds to a chamfer of the lens holder in the manufacturing method of the lens holder in the embodiment of FIG. 5A. Referring to FIGS. 5A and 5C, in this embodiment, an injection molding mold 500 includes a first mold 510 and a second mold 520. A space between the first mold 510 and the second mold 520 is, for example, a molding cavity Cav adapted to form the lens holder 100 in the embodiment of FIGS. 1A to 1D. Specifically, the manufacturing method of the lens holder includes injecting a molding material M into the injection molding mold 500. The injection molding mold 500 includes an injection flow channel 530. The molding material M flows through the injection flow channel 530 and enters the molding cavity Cav of the injection molding mold 500. Referring to FIG. 5C, in this embodiment, the injection flow channel 530 is disposed in correspondence with the chamfer Cf. For example, a gate of the injection flow channel 530 may be connected with the molding cavity Cav, and the position of the gate is where the surface of the chamfer Cf of the lens holder 100 is located after the lens holder 100 is formed. After flowing through the injection flow channel 530, the molding material M enters the molding cavity Cav from the position of the surface of the chamfer Cf Specifically, an included angle between the injection flow channel 530 adjacent to one of the sidewalls 112 and the sidewall 112 is 135 degrees. For example, an included angle between the injection flow channel 530 adjacent to the sidewall 112*b* and the sidewall 112*b* is $\theta_3$, and $\theta_3$ is 135 degrees. Namely, the injection flow channel 530 of this embodiment is perpendicular to the surface of the chamfer Cf. However, in some embodiments, the angle $\theta_3$ may be set to be other values based on the requirements. It should be understood that the invention does not intend to impose a limitation in this regard.

Referring to FIG. 5A, in this embodiment, the manufacturing method of the lens holder further includes curing the molding material M to form the lens holder 100 in the molding cavity Cav after the molding material M is injected into the injection molding mode 500. Then, referring to FIG. 5B, the injection molding mold 500 further includes an ejection unit 540, and the manufacturing method of the lens holder further includes ejecting the lens holder 100 from the molding cavity Cav by using the ejection unit 540, so as to obtain the lens holder 100 from the molding cavity Cav. However, in some embodiments, the lens holder 100 may be obtained from the molding cavity Cav by other means, and the invention does not intend to impose a limitation in this regard. In this embodiment, a portion of the molding material M may protrude from the surface of the chamfer Cf after the molding material M is cured, and the gate mark GM (e.g., the gate mark GM shown in FIGS. 1B and 1C) is thus formed on the chamfer Cf.

Besides, in this embodiment, the manufacturing method of the lens holder may at least be used to manufacture the lens holder 200 in the embodiment of FIG. 2, the lens holder 300 in the embodiment of FIG. 3, or other types of lens holders. For example, when the manufacturing method of the lens holder is used to manufacture the lens holder 200 in the embodiment of FIG. 2, the shape of the molding cavity Cav is designed in correspondence with the shape of the lens holder 200. In addition, the injection molding mold 500 includes two injection flow channels 530, and the injection flow channels 530 are disposed in correspondence with the chamfers Cf of the lens holder 200. When the molding material M is cured, a portion of the molding material M may protrude from the surfaces of the chamfers Cf, and the gate marks GM are forming on the chamfers Cf. Thus, the lens holder 200 has two gate marks GM. In addition, the gate marks GM are respectively disposed at different chamfers Cf. Another example is that, when the manufacturing method of the lens holder is used to manufacture the lens holder 300 in the embodiment of FIG. 3, the shape of the molding cavity Cav is designed to cope with the shape of the lens holder 300. Specifically, the shape of the molding cavity Cav is designed to cope with the shape of the lens holder to be formed, and the number and position of the gate mark of the lens holder are determined by the number and position of the injection flow channel of the injection molding mold. In some embodiments, the injection flow channel of the injection molding mold may be designed to have a pin-point gate. Alternatively, the manufacturing method of the lens holder may further include removing the gate mark after the lens holder is formed. It should be understood that the invention does not intend to impose a limitation in this regard.

Specifically, in the manufacturing method of the lens holder in the embodiment of FIGS. 5A to 5C, the lens holder 100 is formed in the molding cavity Cav of the injection molding mold 500, and the base 110 of the lens holder 100 includes the sidewalls 112. Any two sidewalls 112 are connected to each other to form the outer edge OE. The turning corner TC is formed between two adjacent sidewalls 112 of the sidewalls 112, and the base 110 includes the chamfer Cf located at a turning corner TC. Moreover, the injection flow channel 530 of the injection molding mold 500 is disposed in correspondence with the chamfer Cf. Thus, the lens holder 100 manufactured by using the manufacturing method of the lens holder of this embodiment includes the gate mark GM disposed at the chamfer Cf. Therefore, after entering the molding cavity Cav from the gate point, the molding material M does not need to make a significant turn, and the molding material M may be maintained at a higher flow rate after entering the molding cavity Cav. Thus, the lens holder 100 manufactured by using the manufacturing method of the lens holder of this embodiment has a uniform wall thickness throughout the lens holder 100 and a preferable overall structural strength. In addition, the lens holder 100 has a higher yield rate and a lower manufacturing cost. In addition, according to the manufacturing method of the lens holder, the gate is disposed at the turning corner TC between two adjacent sidewalls 112, so the wall thickness of the sidewalls 112 does not need to be reduced due to the gate. In other words, the thinner sidewalls 112 may be manufactured, so as to make the size of the lens holder 100 smaller. In addition, the manufacturing method of the lens holder according to the embodiment is able to increase the liquidity of the molding material without heating or pressing. Thus, the lens holder 100 does not turn gray or become fragile due to heating, and does not have burrs due to pressing. In other words, the lens holder 100 may have a preferable molding quality. Further to the above, the portable electronic device (e.g., the portable electronic device 400 of FIGS. 4A to 4B) with the small-sized lens holder 100 may be thinner and lighter. In addition, the manufacturing cost of the portable electronic device is also lower.

Besides, in this embodiment, after the manufacturing method of the lens holder is adopted to manufacture the lens holder 200 in the embodiment of FIG. 2 and the lens holder 300 in the embodiment of FIG. 3, the lens holder 200 and the lens holder 300 also exhibit the efficacy of the lens holder 100. Namely, the lens holder 200 and the lens holder 300 have a uniform wall thickness and a preferable overall structural strength. In addition, the lens holder 200 and the lens holder 300 have a preferable yield rate and a lower manufacturing cost. Furthermore, the thinner sidewalls may be manufactured, so as to make the sizes of the lens holder 200 and the lens holder 300 smaller. Besides, the lens holder 200 and the lens holder 300 may have a preferable molding quality. Further to the above, when the portable electronic device adopts the small sized lens holder 200 or lens holder 300, the portable electronic device may be thinner and lighter. In addition, the manufacturing cost of the portable electronic device may be lower.

Figure 6:
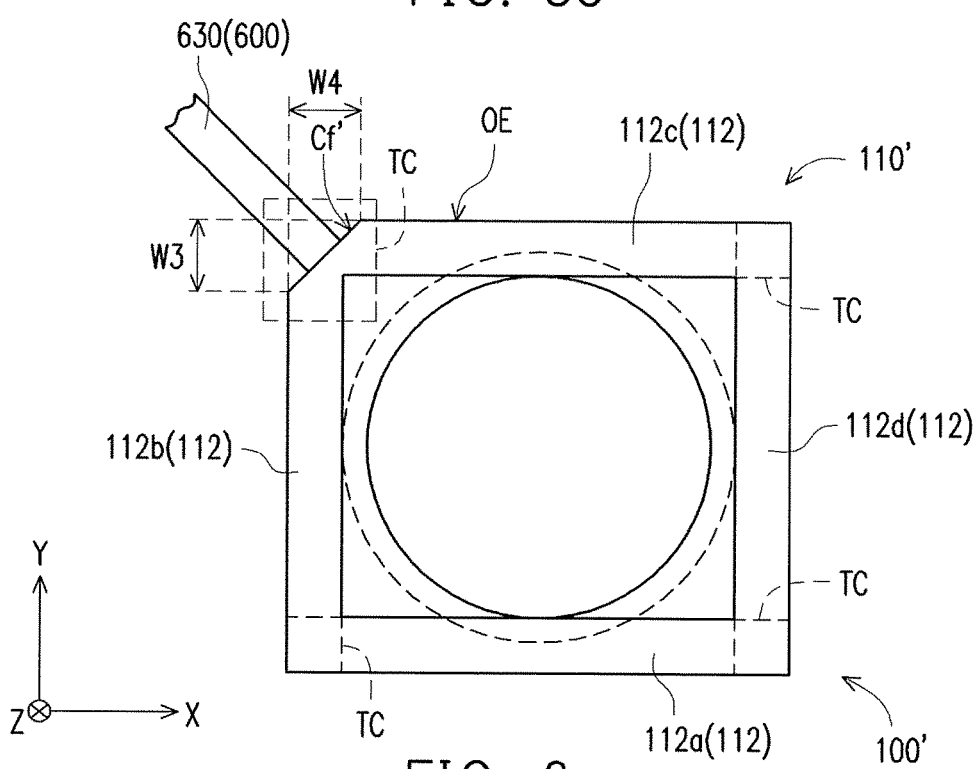
FIG. 6 is a schematic view illustrating that an injection flow channel corresponds to a chamfer of a lens holder in a manufacturing method of a lens holder according to another embodiment of the invention.

FIG. 6 is a schematic view illustrating that an injection flow channel corresponds to a chamfer of a lens holder in a method for manufacturing a lens holder according to another embodiment of the invention. Referring to FIG. 6, a lens holder 100' is formed by using an injection molding mold 600. The injection molding mold 600 is similar to the injection molding mold 500 in the embodiment of FIGS. 5A to 5C, and the lens holder 100' is similar to the lens holder 100 in the embodiment of FIGS. 1A to 1D. The components and relevant descriptions concerning the injection molding mold 600 may be referred to the injection molding mold 500 in the embodiment of FIGS. 5A to 5C, and the components and relevant descriptions concerning the lens holder 100' may be referred to the lens holder 100 in the embodiment of FIGS. 1A to 1D. Thus, details in these respects will not be repeated in the following. The differences between the lens holder 100 and the lens holder 100' may be referred to the following. A base 110' of the lens holder 100' includes a chamfer Cf. The chamfer Cf has a width W3 in a direction parallel to the first axis X, the chamfer Cf has a width W4 in a direction parallel to the second axis Y, and the width W3 is equal to the width W4. Specifically, the width W3 (or the width W4) of the chamfer Cf is greater than the width W1 (or the width W2) of the chamfer Cf in the embodiment of FIGS. 1A to 1D. Furthermore, the differences between the injection molding mold 600 and the injection molding mold 500 may be referred to the following. A cross-sectional area of an injection flow channel 630 of the injection molding mold 600 is greater than a cross-sectional area of the injection flow channel 530 of the injection molding mold 500. Specifically, in this embodiment, if the width of the chamfer that is chosen is greater, the cross-sectional area of the injection flow channel that is chosen is also greater. Moreover, the greater the cross-sectional area of the injection flow channel, the better the liquidity of the molding material M becomes. Besides, the greater injection flow channel allows more molding material M to enter the molding cavity at the same time. Also, the molding material M does not need to make a significant turn after entering the molding cavity Cav from the gate point. Therefore, the molding material M may be maintained at a higher flow rate. Consequently, the molding material M may be more rapidly filled into the molding cavity Cav, and the wall thickness of the lens holder formed by curing the molding material M has a uniform wall thickness throughout the lens holder and a preferable overall structural strength. In addition, the lens holder has a high yield rate and a lower manufacturing cost. Besides, the lens holder formed by adopting the manufacturing method of the lens holder of this embodiment may also exhibit the efficacy in the embodiment of FIGS. 1A to 1D. Namely, the thinner sidewalls may be manufactured to make the size of the lens holder smaller. The lens holder may also have a preferable molding quality. Furthermore, when the portable electronic device adopts the small-sized lens holder formed by using the manufacturing method of the lens holder, the portable electronic device may be thinner and lighter. In addition, the manufacturing cost of the portable electronic device may be lower.

In view of the foregoing, in the manufacturing method of the lens holder according to the embodiments of the invention, the base of the lens holder formed in the molding cavity of the injection molding mold includes a plurality of sidewalls. Any two sidewalls are connected to each other to form the outer edge. The turning corner is formed between two adjacent sidewalls of the sidewalls, and the base includes the chamfer located at a turning corner. The injection flow channel of the injection molding mold is disposed in correspondence with the chamfer. Thus, the lens holder manufactured by using the manufacturing method of the lens holder of according to the embodiments of the invention includes the gate mark disposed at the chamfer. Thus, after the molding material enters the molding cavity from the gate point, the molding material does not need to make a significant turn, and the molding material may be maintained at a higher flow rate after entering the molding cavity. Thus, the lens holder manufactured by using the manufacturing method of the lens holder according to the embodiments of the invention has a uniform wall thickness throughout the lens holder and a preferable overall structural strength. In addition, the lens holder has a higher yield rate and a lower manufacturing cost. In addition, according to the manufacturing method of the lens holder, the gate is disposed at the turning corner between two adjacent sidewalls, so the wall thickness of the sidewalls does not need to be reduced due to the gate. In other words, the thinner sidewalls may be manufactured, so as to make the size of the lens holder smaller. In addition, the manufacturing method of the lens holder is able to increase the liquidity of the molding material without heating or pressing, so the lens holder may have a preferable molding quality. Furthermore, the portable electronic device with the small-sized lens holder may be thinner and lighter, and the manufacturing cost of the portable electronic device may be lower.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lens holder, comprising:
   a base, comprising a plurality of sidewalls, wherein any two adjacent sidewalls are connected to each other to form an outer edge, a turning corner is formed between every two adjacent sidewalls of the sidewalls, and the base comprises a chamfer located at a turning corner;
   a gate mark, disposed at the chamfer; and
   a tubular portion, connected to the base and extending in a direction away from the base.

2. The lens holder as claimed in claim 1, wherein the sidewalls are four sidewalls, the base comprises two chamfers at two of the turning corners, and the chamfers are located on a diagonal of the outer edge.

3. The lens holder as claimed in claim 2, wherein the lens holder comprises two gate marks, and the gate marks are respectively disposed at different chamfers of the chamfers.

4. The lens holder as claimed in claim 1, wherein the sidewalls comprise a first sidewall and a second sidewall, the first sidewall and the second sidewall respectively form a long side and a short side of the outer edge, and a wall thickness of the first sidewall is greater than a wall thickness of the second sidewall.

5. The lens holder as claimed in claim 1, wherein the outer edge is a rectangle with the chamfer at a corner.

6. The lens holder as claimed in claim 1, wherein the sidewalls have a wall thickness d, an angle of the chamfer is substantially 45 degrees, a width of the chamfer is substantially $(2-\sqrt{2})d$, and a tolerance of a width of the chamfer is smaller than or equal to 10% of $(2-\sqrt{2})d$.

7. The lens holder as claimed in claim 1, wherein the sidewalls further form an inner edge, the inner edge is a rectangle, and a size of the inner edge is suitable for a light sensing element whose size is smaller than or equal to one inch.

8. A portable electronic device, comprising a mobile phone, a tablet computer, or a notebook computer, wherein the portable electronic device comprises:
   the lens holder as claimed in claim 1;
   a lens barrel, disposed on the lens holder; and
   at least one lens, disposed in the lens barrel.

9. A manufacturing method of a lens holder, comprising:
   injecting a molding material into an injection molding mold, wherein the injection molding mold comprises an injection flow channel, and the molding material flows through the injection flow channel and enters a molding cavity of the injection molding mold; and
   curing the molding material to form a lens holder in the molding cavity, wherein the lens holder comprises a base, a gate mark and a tubular portion, the base comprises a plurality of sidewalls, any two adjacent sidewalls are connected to each other to form an outer edge, a turning corner is formed between every two adjacent sidewalls of the sidewalls, the base comprises a chamfer located at a turning corner, the gate mark is disposed at the chamfer, the injection flow channel is disposed in correspondence with the chamfer, and the tubular portion is connected to the base and extends in a direction away from the base.

10. The manufacturing method of the lens holder as claimed in claim 9, wherein the sidewalls are four sidewalls, the base comprises two chamfers at two of the turning corners, and the chamfers are located on a diagonal of the outer edge.

11. The manufacturing method of the lens holder as claimed in claim 10, wherein the injection molding mold comprises two injection flow channels, and the injection flow channels are disposed in correspondence with the chamfers.

12. The manufacturing method of the lens holder as claimed in claim 9, wherein an included angle between the injection flow channel adjacent to one of the sidewalls and the one of the sidewalls is 135 degrees.

13. The manufacturing method of the lens holder as claimed in claim 9, wherein a cross-sectional area of the injection flow channel is selected in accordance to a width of the chamfer.

14. The manufacturing method of the lens holder as claimed in claim 9, wherein the sidewalls comprise a first sidewall and a second sidewall, the first sidewall and the second sidewall respectively form a long side and a short side of the outer edge, and a wall thickness of the first sidewall is greater than a wall thickness of the second sidewall.

15. The manufacturing method of the lens holder as claimed in claim 9, wherein the outer edge is a rectangle with the chamfer at a corner.

16. The manufacturing method of the lens holder as claimed in claim 9, wherein the sidewalls have a wall thickness d, an angle of the chamfer is substantially 45 degrees, a width of the chamfer is substantially $(2-\sqrt{2})d$, and a tolerance of a width of the chamfer is smaller than or equal to 10% of $(2-\sqrt{2})d$.

17. The manufacturing method of the lens holder as claimed in claim 9, wherein the injection flow channel has a pin-point gate.

18. The manufacturing method of the lens holder as claimed in claim 9, wherein the lens holder is ejected from the molding cavity by using an ejection unit.

* * * * *